United States Patent [19]
Saunders

[11] Patent Number: 5,855,404
[45] Date of Patent: Jan. 5, 1999

[54] MOTORCYCLE WINDSHIELD FAIRING

[76] Inventor: Charles A. Saunders, 8380 - 36th Ave., Columbus, Nebr. 68601

[21] Appl. No.: 753,406

[22] Filed: Nov. 25, 1996

[51] Int. Cl.⁶ .................................................. B62D 35/00
[52] U.S. Cl. ........................ 296/78.1; 296/180.1; 296/91
[58] Field of Search ........................ 296/78.1, 91, 96.11, 296/96.2, 96.21, 86, 87, 88, 180.1, 180.3; 180/903

[56] References Cited

U.S. PATENT DOCUMENTS

| D. 266,159 | 9/1982 | Johnson et al. | D12/182 |
|---|---|---|---|
| D. 284,564 | 7/1986 | Kopecky | D12/182 |
| 3,904,238 | 9/1975 | Anderson et al. | 296/78.1 |
| 4,066,291 | 1/1978 | Hickman | 296/78.1 |
| 4,087,110 | 5/1978 | Vetter | 296/78.1 |
| 4,166,650 | 9/1979 | Saunders, IV | 296/78.1 |
| 4,331,358 | 5/1982 | Johnson et al. | 296/78.1 |
| 4,353,590 | 10/1982 | Wei-Chuan | 296/78.1 |
| 4,355,838 | 10/1982 | Hickman | 296/78.1 |
| 4,379,584 | 4/1983 | Willey | 296/78.1 |
| 4,461,508 | 7/1984 | Ogishima | 296/78.1 |
| 4,479,663 | 10/1984 | Morris et al. | 296/78.1 |
| 4,529,242 | 7/1985 | Watanabe et al. | 296/78.1 |
| 4,696,509 | 9/1987 | Yagasaki et al. | 296/78.1 X |
| 4,707,017 | 11/1987 | Minobe et al. | 296/78.1 |
| 5,174,626 | 12/1992 | Wiley, Jr. et al. | 296/180.1 |
| 5,409,287 | 4/1995 | Suzuki | 296/78.1 X |

FOREIGN PATENT DOCUMENTS

| 3609595 | 9/1987 | Germany | 296/78.1 |
|---|---|---|---|
| 65483 | 3/1991 | Japan | 296/78.1 |

*Primary Examiner*—Joseph D. Pape
*Attorney, Agent, or Firm*—Zarley, McKee, Thomte, Voorhees & Sease; Mark D. Frederiksen

[57] ABSTRACT

A motorcycle windshield fairing including a transparent fairing removably connected to the motorcycle and extending upwardly and rearwardly from an upper end of the existing windshield on the motorcycle. A first connector on the rearward face of the fairing is selectively connectable to a plurality of receiving members on the windshield, to permit longitudinal adjustment of the fairing on the windshield. A support arm extends between the upper rearwardly end of the fairing and the motorcycle, and is pivotally connected at each end and is extensible to permit selective pivotal movement of the fairing to change the angle of attack.

11 Claims, 3 Drawing Sheets

5,855,404

MOTORCYCLE WINDSHIELD FAIRING

TECHNICAL FIELD

The present invention relates generally to fairings for motorcycles, and more particularly to an improved detachable adjustable fairing for the windshield of a motorcycle.

BACKGROUND OF THE INVENTION

In open cockpit vehicles, such as motorcycles, a fairing or windshield of curved clear plastic is typically provided to protect the rider from the effects of wind and particulate or rain in the air.

As motorcycles have been modernized and streamlined, the windshield mounted on the vehicles have gradually decreased in length and taken on a much steeper angle (oriented more towards the horizontal). While these modifications decrease wind resistance, they require that the rider lean downwardly closely adjacent the vehicle so as to take advantage of the slip stream created by the steeply sloped windshield.

For the taller rider, or the rider who does not wish to lean forwardly and downwardly, the air passing over the windshield will contact the face or helmet of the rider, causing vibration in the motorcyclist's helmet and a buffeting air pattern around the head of the rider, within the cockpit of the motorcycle.

SUMMARY OF THE INVENTION

It is therefore a general object of the present invention to provide an improved fairing for a motorcycle windshield.

Another object is to provide a motorcycle windshield fairing which is easily removable from the motorcycle.

Still another object of the present invention is to provide a motorcycle windshield fairing which may be adjusted longitudinally, forwardly and rearwardly on the windshield, and which has an adjustable slope.

These and other objects will be apparent to those skilled in the art.

The motorcycle windshield fairing of the present invention includes a transparent fairing removably connected to the motorcycle and extending upwardly and rearwardly from an upper end of the existing windshield on the motorcycle. A first connector on the rearward face of the fairing is selectively connectable to a plurality of receiving members on the windshield, to permit longitudinal adjustment of the fairing on the windshield. A support arm extends between the upper rearwardly end of the fairing and the motorcycle, and is pivotally connected at each end and is extensible to permit selective pivotal movement of the fairing to change the angle of attack. The removability of the fairing also permits the fairing to "pop off" in a collision, thereby enhancing the safety characteristics of the device.

DESCRIPTION OF THE PREFERRED EMBODIMENT

Figure 1:
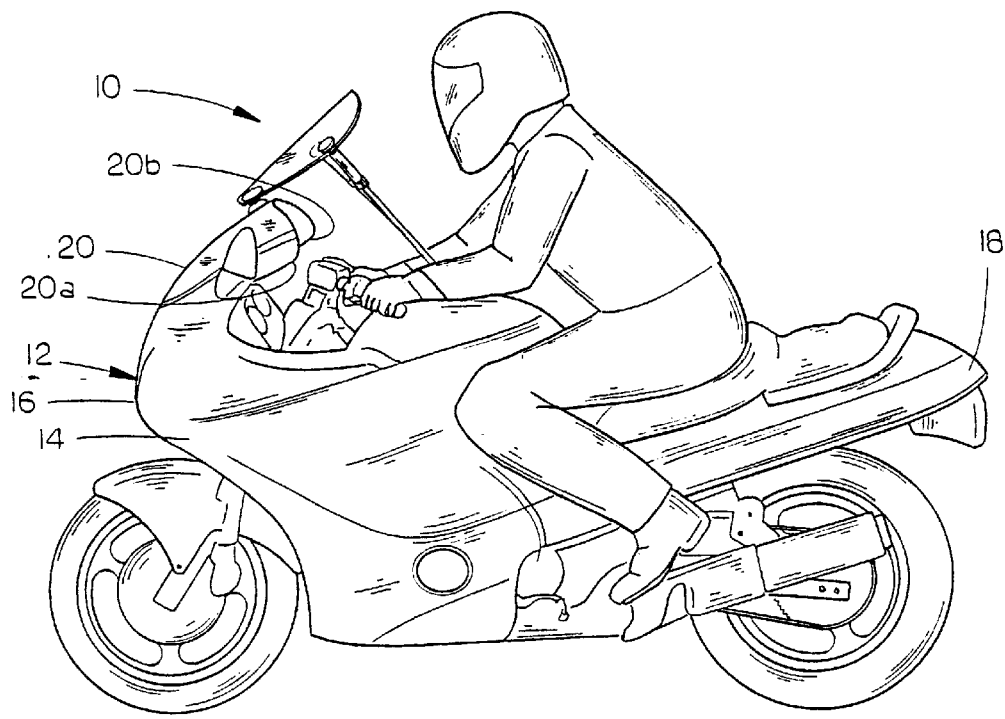
FIG. 1 is a perspective view of a motorcycle with the fairing of the present invention installed thereon.

Referring now to the drawings, in which similar or corresponding parts are identified with the same reference numeral and more particularly to FIG. 1, the fairing of the present invention is designated generally at 10 and is shown attached to a motorcycle 12.

Motorcycle 12 includes a body 14 having a forward end 16 and a rearward end 18. A windshield 20 extends upwardly and rearwardly from the upper end of the body forward end 16, and is curved along a transverse axis from side edge 20a to side edge 20b.

Figure 3:
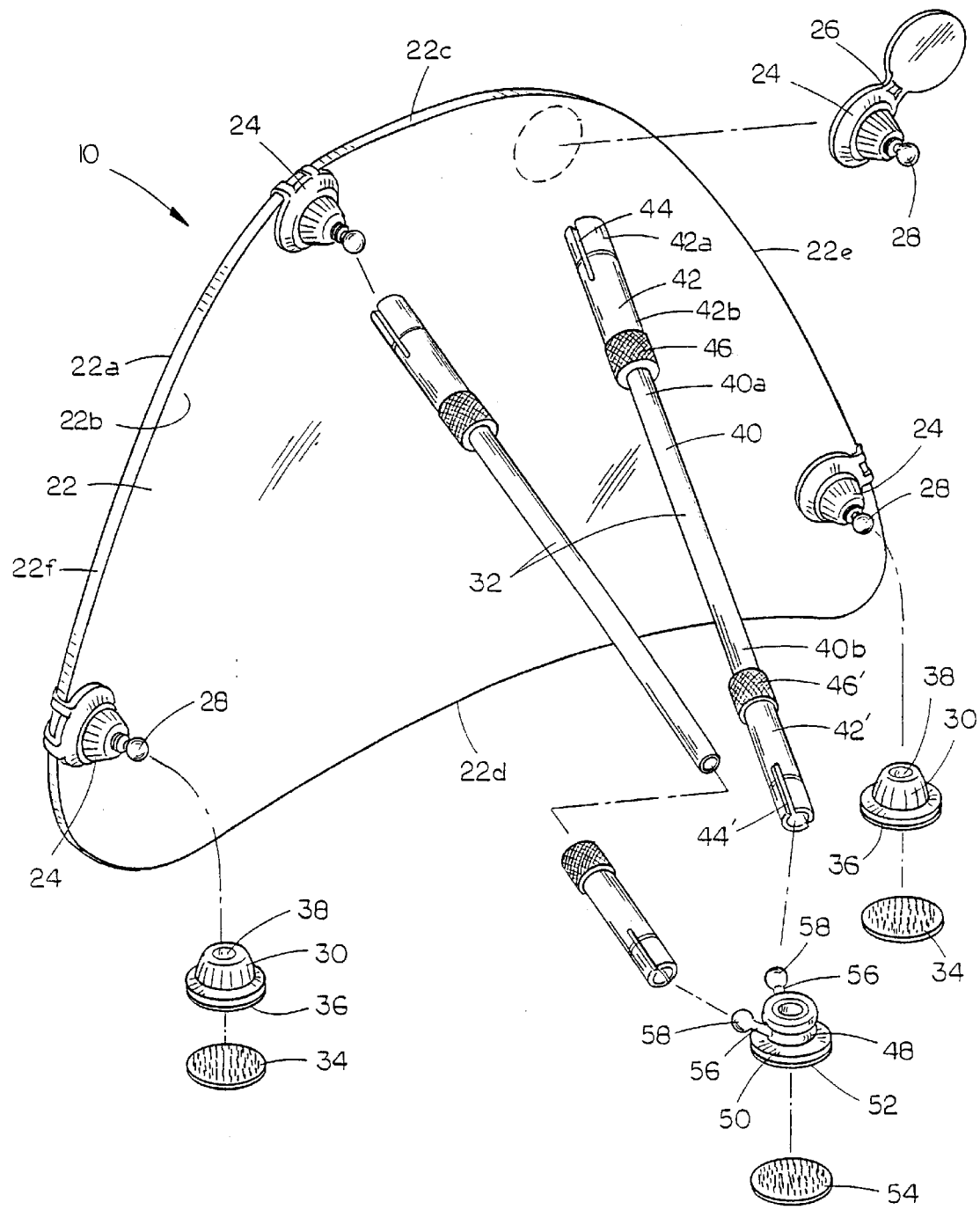
FIG. 3 is an enlarged perspective view taken from the rearward side of the fairing.
Figure 4:
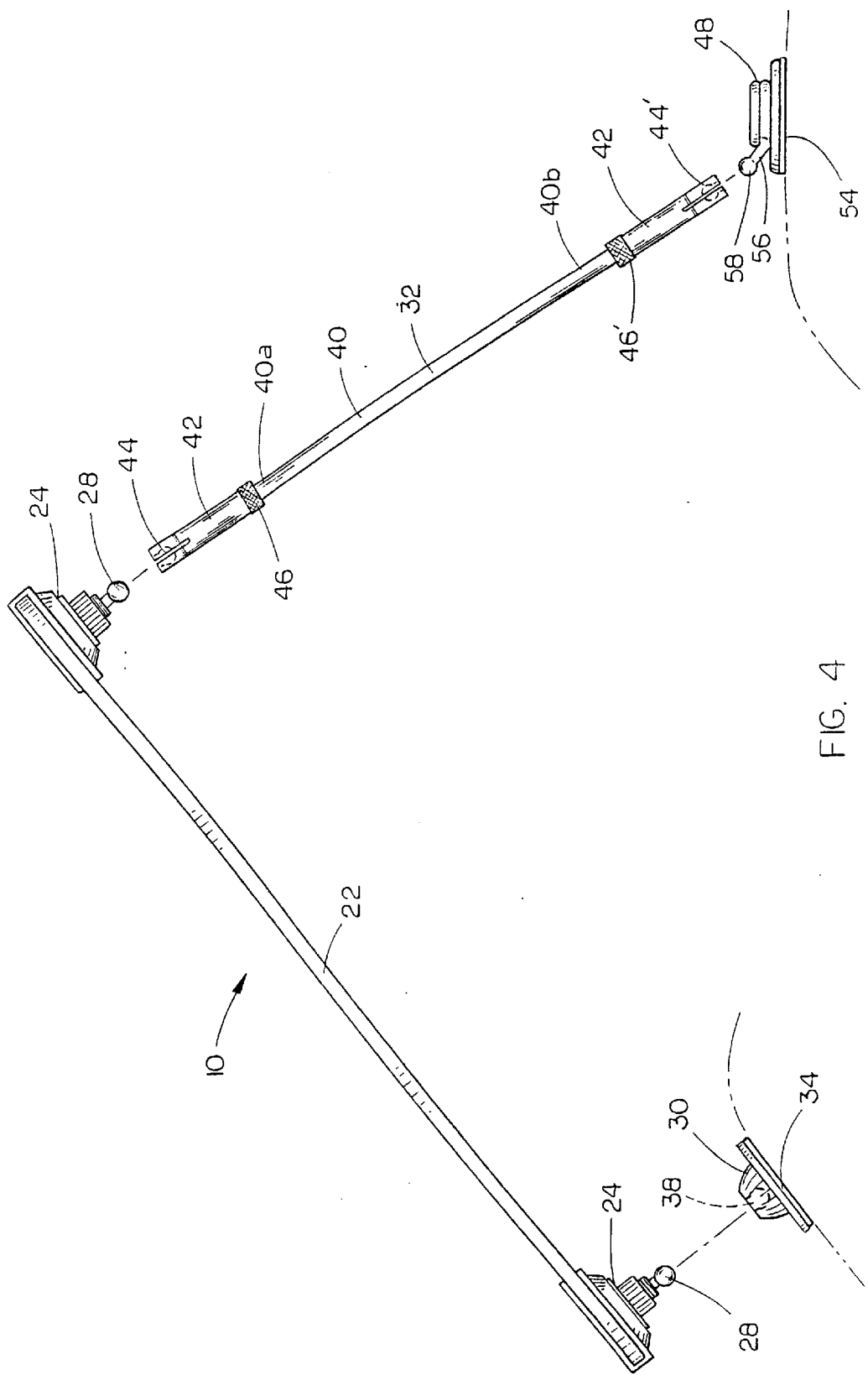
FIG. 4 is an enlarged side elevational view of the fairing.

Referring now to FIG. 3, fairing 10 includes a transparent plate 22 having forward and rearward faces 22a and 22b, upper and lower edges 22c and 22d, and opposing side edges 22e and 22f. Plate 22 is formed of a transparent material and serves as a shield against wind, rain, and bugs or particulate passing through the air as the motorcycle travels down the road.

Plate 22 is preferably curved along its transverse axis to generally follow the transverse curvature of windshield 20 on the motorcycle. Four connectors 24 are removably and adjustably mounted to plate 22 for attaching fairing 10 to the motorcycle. As shown in FIG. 3, one pair of transversely spaced apart connectors 24 are attached to the rearward face of plate 22 along upper edge 22c, while a second pair of connectors are attached to the plate rearward face 22b proximal the lower edge 22d. Each connector 24 includes a base 26 which is directly mounted to plate 22, and a rearwardly projecting ball 28 projecting from the base 26. A pair of receiver members 30 are provided for removable operable connection to the ball 28 of the lower pair of connectors. A pair of support legs 32 are provided for removable operable connection to the upper pair of connectors 24, as described in more detail hereinbelow.

Figure 2:
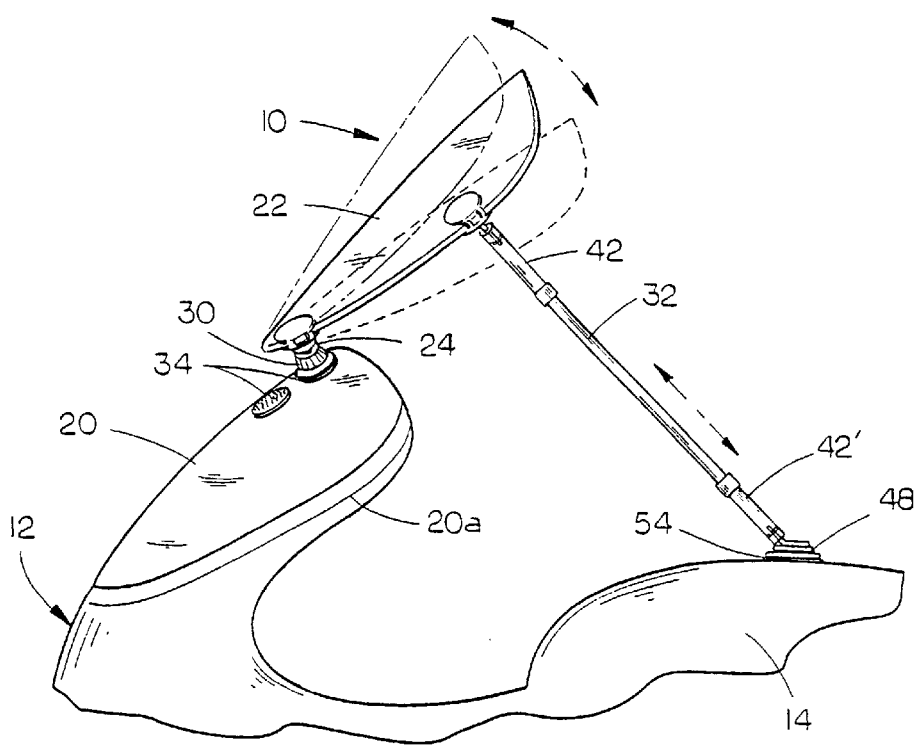
FIG. 2 is an enlarged side elevational view of the fairing mounted on a motorcycle.

Referring now to FIG. 2, it can be seen that fairing 10 is attached to motorcycle 12 with the lower end of plate 22 operably connected to windshield 20, and the upper end of plate 22 operably connected to the body 14 of the motorcycle. Support legs 32 are selectably extensible, to permit adjustment of the "angle of attack" of plate 22 relative to wind directed against fairing 10 (the wind traveling in a generally horizontal direction). The angle of attack may also be adjusted by repositioning of the upper connectors on plate 22 or the repositioning of the lower end of support legs 32. In addition, plate 22 may be moved forwardly or rearwardly by relocating receiver members 30 more forwardly or rearwardly along windshield 20. This relocation would also affect the angle of attack of the plate 22.

Referring once again to FIG. 3, a fastener patch 34 is provided with one-half of a hook and loop fastener on the upper surface thereof, to releasably mount receiver members 30 to the motorcycle windshield. Receiver members 30 have a corresponding portion of hook and loop fastener material 36 mounted on the bottom thereof which permits selective removable attachment of receiver members 30 to the fastener patches 34. Receiver members 30 each include a receiver socket 38 which will receive the ball 28 of the corresponding connector 24 for a pivotable, rotatable and removable fit therein, in a conventional fashion. In this way, lower connectors 24 may be selectively removed from receiver members 30, as desired. In addition, as shown in FIG. 2, receiver members 30 may be attached to windshield 20 on any one of a plurality of fastener patches 34 affixed to the windshield 20, to thereby permit longitudinal movement of plate 22 forwardly and rearwardly relative to the motorcycle.

Support legs 32 each include an elongated rod 40 having a first receiver tube 42 operably connected to a forward end 40a, and a second receiver tube 42' operably mounted to a rearward end 40b of rod 40. Receiver tube 42 includes a distal end 42a with a socket 44 formed therein for selective receipt of the ball 28 of one of the upper connectors 24. The proximal end 42b of receiver tube 42 has a compression nut 46 operably connected thereto such that rod may be selectively telescoped within receiver tube 42 to thereby adjust the length of support leg 32. Receiver tube 42' includes the same socket 44' and compression nut 46' as receiver tube 42, and support legs 32 are identical to one another.

A support member 48 is provided to interconnect the lower end of support legs 32 to the motorcycle body 14. While it is apparent that support legs 32 could be individually and independently connected to the body 14 of motorcycle 12, the preferred embodiment utilizes a single connection point at support member 48. Support member 48 includes a base 50 having one-half of a hook and loop fastener 52 on the bottom thereof adapted for selective cooperable attachment to a hook and loop fastener patch 54 mounted in a desired location on the motorcycle body. Base 50 has a pair of projecting stems 56 having a ball 58 at the free ends thereof, for receipt within the socket 44' of the receiver tubes 42' of each support leg 32.

In use, the motorcycle owner can attach or remove fairing 10 from the motorcycle as desired for the particular driving conditions. Removal of support legs 32 from support member 48 and the lower pair of connectors 24 from receiver members 30, as shown in FIG. 2, permits complete removal of fairing 10 in a simple and easy operation. If desired, support member 48 and receiver members 30 may also be removed from the motorcycle, by detaching them from the associated fastener patches 54 and 34 respectively.

Fairing 10 may be reattached to the motorcycle in the same fashion, and then adjusted as desired for the particular rider on the motorcycle. The angle of attack of plate 22 may be varied by lengthening or shortening support legs 32, or by repositioning of the connectors 24 or the lower end of support legs 32, as discussed above. The pivotal connection of connectors 24 to receiver members 30 and receiver tubes 42 permits adjustment, as shown in FIG. 2. Similarly, the pivotable connection of receiver tubes 42' with support member 48 also permits this adjustment.

The use of a plurality of fastener patches 34 located on windshield 20 and spaced longitudinally therealong permits the adjustment of the position of plate 22 forwardly and rearwardly along windshield 20, as desired.

The inventor herein has provided an ancillary fairing 10 which is positioned generally upwardly and rearwardly from the upper rearward end of the existing windshield 20 of a motorcycle, to enhance the shielding characteristics of the motorcycle windshield 20. As shown and described above, there is a gap between the lower edge of fairing 10 and the upper edge and surface of windshield 20, through which air may pass. This gap may be adjusted as desired between connectors 24 and receiving members 30. Air flow along the interior surface of the fairing 10 provides counterbalance for the capsule space in which the rider sits. It has been found that this gap decreases the buffeting which can occur in the capsule behind the conventional windshield/fairings of the prior art. Adjustment of the angle of attack of the fairing, as well as the location of the fairing permits "tuning" of the air flow.

Whereas the invention has been shown and described in connection with the preferred embodiment thereof, many modifications, substitutions and additions may be made which are within the intended broad scope of the appended claims.

I claim:

1. In combination:
    a motorcycle having a body with forward and rearward ends;
    a windshield extending upwardly and rearwardly from an upper portion of the forward end of the motorcycle;
    a substantially transparent fairing removably connected to the motorcycle and extending upwardly and rearwardly from an upper end of the windshield;
    said fairing including a plate having upper and lower edges, opposing side edges and forward and rearward faces;
    a first connector on the rearward face of the plate;
    a receiver member mounted on the windshield operably connected to the first connector for pivotable movement of the plate about the receiver member;
    a second connector mounted on the plate rearward face proximal the upper edge of the plate; and
    a first support arm having an upper end operably connected to said second connector and a lower end operably connected to the motorcycle body.

2. The combination of claim 1, wherein said support arm is length adjustable, to selectively pivot the plate about the receiver member and thereby selectively change an angle of attack at the fairing.

3. The combination of claim 2, further comprising a support member mounted on the motorcycle body, and wherein said support arm includes:
    an elongated rod having upper and lower ends,
    a first receiver tube operably mounted for selective telescoping movement on the rod upper end, and
    a second receiver tube mounted on the support arm lower end,
    wherein a distal end of the first receiver tube is operably, pivotably connected to the second connector; and
    wherein a distal end of the second receiver tube is operably, pivotably connected to said support member.

4. The combination of claim 3, wherein said receiver member includes a base portion with one-half of a cooperable fastener thereon, and further comprising a plurality of second halves of the cooperable fastener mounted on the windshield, said fastener first half selectively, removably connected to one of said plurality of fastener second halves.

5. The combination of claim 4, wherein said plurality of fastener second halves are arranged along a line extending longitudinally along the windshield from the rearward end towards the forward end.

6. The combination of claim 5, wherein said fairing is spaced upwardly away from the rearward end of the windshield, forming an air gap therebetween.

7. The combination of claim 1, further comprising a support member mounted on the motorcycle body, and wherein said support arm includes:
    an elongated rod having upper and lower ends,
    a first receiver tube operably mounted for selective telescoping movement on the rod upper end, and
    a second receiver tube mounted on the support arm lower end,
    wherein a distal end of the first receiver tube is operably, pivotably connected to the second connector; and
    wherein a distal end of the second receiver tube is operably, pivotably connected to said support member.

8. The combination of claim 1, wherein said fairing is spaced upwardly away from the rearward end of the windshield, forming an air gap therebetween.

9. In combination:

a motorcycle having a body with forward and rearward ends;

a windshield extending upwardly and rearwardly from an upper portion of the forward end of the motorcycle;

a substantially transparent fairing removably connected to the motorcycle and extending upwardly and rearwardly from an upper end of the windshield;

said fairing including a plate having upper and lower edges, opposing side edges and forward and rearward faces;

a first connector on the rearward face of the plate;

a receiver member mounted on the windshield operably connected to the first connector for pivotable movement of the plate about the receiver member;

said receiver member including a base portion with one-half of a cooperable fastener thereon; and a plurality of second halves of the cooperable fastener mounted on the windshield, said fastener first half selectively, removably connected to one of said plurality of fastener second halves said plurality of fastener second halves being arranged along a line extending longitudinally along the windshield from the rearward end towards the forward end.

10. In combination:

a motorcycle having a body with forward and rearward ends;

a windshield extending upwardly and rearwardly from an upper portion of the forward end of the motorcycle;

a substantially transparent fairing removably connected to the motorcycle and extending upwardly and rearwardly from an upper end of the windshield;

said fairing including having upper and lower edges, opposing side edges and forward and rearward faces;

a first connector on the rearward face of the fairing;

a receiver member mounted on the windshield operably connected to the first connector for selective removable connection of the fairing to the receiver member;

a second connector mounted on the fairing rearward face proximal the upper edge of the fairing; and a first support arm having an upper end operably connected to said second connector and a lower end operably connected to the motorcycle body.

11. In combination:

a motorcycle having a body with forward and rearward ends;

a windshield extending upwardly and rearwardly from an upper portion of the forward end of the motorcycle;

a substantially transparent fairing removably connected to the motorcycle and extending upwardly and rearwardly from an upper end of the windshield;

said fairing including a plate having upper and lower edges, opposing side edges and forward and rearward faces;

a first connector on the rearward face of the plate;

a receiver member mounted on the windshield operably connected to the first connector for selective removable connection of the plate to the receiver member;

said receiver member including a base portion with one-half of a cooperable fastener thereon; and a plurality of second halves of the cooperable fastener mounted on the windshield, said fastener first half selectively, removably connected to one of said plurality of fastener second halves said plurality of fastener second halves being arranged along a line extending longitudinally along the windshield from the rearward end towards the forward end.

* * * * *